United States Patent [19]

Okahashi et al.

[11] Patent Number: 4,785,852

[45] Date of Patent: Nov. 22, 1988

[54] CONDUCT PIPE COVERED WITH ELECTRICALLY INSULATING MATERIAL

[75] Inventors: Kazuo Okahashi; Ichiro Takahashi, both of Osaka, Japan

[73] Assignee: Mitsubishi Denki Kabushiki Kaisha, Tokyo, Japan

[21] Appl. No.: 591,249

[22] Filed: Mar. 21, 1984

Related U.S. Application Data

[63] Continuation of Ser. No. 427,342, Sep. 29, 1982, abandoned.

[30] Foreign Application Priority Data

Oct. 12, 1981 [JP] Japan ................................ 56-162246

[51] Int. Cl.⁴ ............................................... F16L 9/02
[52] U.S. Cl. ..................................... 138/109; 166/248
[58] Field of Search .......... 138/145, DIG. 3, DIG. 6, 138/DIG. 7, 109; 166/248, 302; 174/110 E, 110 FC, 110 SR; 525/471, 396; 528/125

[56] References Cited

U.S. PATENT DOCUMENTS

| 2,646,822 | 7/1953 | Ferguson | 138/145 X |
| 3,446,654 | 5/1969 | Barth | 528/125 X |
| 3,956,240 | 5/1976 | Dahl et al. | 528/125 |
| 4,157,287 | 6/1979 | Christenson | 166/248 X |
| 4,303,128 | 12/1981 | Marr, Jr. | 166/302 |

FOREIGN PATENT DOCUMENTS

| 771255 | 11/1967 | Canada | 174/110 E |
| 1306231 | 2/1973 | United Kingdom | 525/396 |

Primary Examiner—Mark J. Thronson
Attorney, Agent, or Firm—Sughrue, Mion, Zinn, Macpeak, and Seas

[57] ABSTRACT

A conduct pipe covered with an electrical insulating material, which is obtained by a process comprising winding a polyether ether ketone resin film around the outside of a metal conduct pipe, carrying out impregnation treatment in vacuum under pressure with using an impregnant resin comprising an ether bonding epoxy resin, and thereafter hardening by heating, is disclosed. The conduct pipe is particularly useful in an electrode apparatus for collecting underground hydrocarbon resources by an electrically heating method.

5 Claims, 1 Drawing Sheet

CONDUCT PIPE COVERED WITH ELECTRICALLY INSULATING MATERIAL

This application is a continuation of Ser. No. 427,342 filed 9/29/82, now abandoned.

FIELD OF THE INVENTION

The present invention relates to a conduct pipe covered with an electrically insulating material and particularly, to a conduct pipe covered with an electrically insulating material used for collecting underground hydrocarbon resources by an electrically heating method. The material is a water resistant resin material which can withstand hot water up to 350° C. with almost no loss of mechanical strength.

In this specification, the term: underground hydrocarbon resources means bitumen contained in oil sand or tar sand, referred to hereinafter as "oil" unless otherwise stated.

BACKGROUND OF THE INVENTION

Recently, there has been a rise in prices of petroleum resources. Accordingly, there have been a number of studies on processes for collecting oils from oil sand layers buried underground in areas such as Canada or Venezuela. The oil sand is generally in a layer having a thickness of about 50 m. This layer is underground at a depth of several hundred meters. However, oils in the oil sand cannot be collected by extracting them at a normal temperature due to their high viscosity. Therefore, at the present time, one method of extracting the oils comprises raising the temperature of the oils by injecting heated steam into the oil sand layer. This reduces the viscosity of the oils. However, this method is not efficient due to the increase in cost. Accordingly, studies have been carried out to provide a highly productive method of collecting oils. One such method involves the use of two conduct pipes (steel pipes or stainless steel pipes) each having an electrode part on the end thereof. The pipes are buried at an interval of about 30 to 200 m so that the electrode part is situated on the oil sand layer. Then an electric potential of several hundred volts to several ten thousand volts is applied to both electrodes. This raises the temperature of the oil sand layer by Joule's heat and reduces the viscosity of the oils.

The specific resistance of the oil sand layer is several times higher than that of the upper strata. Accordingly, it is necessary for the conduct pipes to be covered with an electrically insulating material over the part which is buried in the strata in order to prevent the electric current from flowing through the upper strata. If the conduct pipes are not covered with an electrically insulating material, the electrical current does not flow between the electrodes buried in the oil sand layer, because it flows through the stratum part. Accordingly, there is a need to develop conduct pipes covered with an electrical insulating material which can be used under such specific conditions.

The electrical insulating material should include the following characteristics:

(A) capable of withstanding voltage characteristic of several hundred volts to several thousand volts and a volume resistivity of at least $10^6 \Omega$-cm at not only a normal temperature but also a temperature capable of reducing the viscosity of oils in the oil sand layer (about 300° C.), (B) capable of withstanding hot water having a temperature of about 300° C., because water contained in the oil sand layer is heated to a temperature capable of reducing the viscosity of the oil sand layer (about 300° C.), and (C) a mechanical strength capable of attaching the electrode and mechanical impact strength of such a degree that it is not broken by contacting the wall of the pit when burying the electrode attached on the end of the conduct pipe in the oil sand layer.

Thermoplastic resins such as polyethylene, polypropylene, polybutylene and polystyrene are known as materials having excellent water resistance. However, they have poor heat resistance and therefore cannot be used as a water resistant material at temperatures above about 80° C.

Thermoplastic resins such as polysulfone resin, polyether sulfone resin, polyphenylene sulfide resin and polytetrafluoroethylene resin have been developed and used as resin materials having improved hot water resistance. These thermoplastic resins have excellent heat resistance and can withstand hot water. However, they are not desirable because their mechanical strength deteriorates when they are left in hot water.

SUMMARY OF THE INVENTION

The present inventors have carried out studies in order to develop conduct pipes covered with an electrical insulating material having the characteristics (A) to (C) described above. As a result of these studies they have found that a conduct pipe covered with an electrical insulating material having the characteristics described above can be obtained by a particular process. The process comprises winding a polyether ether ketone resin film round the outside of the conduct pipe in layers, carrying out impregnation treatment in vacuum under pressure using an impregnant resin comprising an ether bonding epoxy resin, and thereafter hardening by heating.

The present invention relates to a conduct pipe covered with an electrical insulating material and particularly, to one useful in an electrode apparatus for electrically heating underground hydrocarbon resources. The invention is obtained by a process comprising winding a polyether ether ketone resin film round the outside of a metal conduct pipe, carrying out impregnation treatment in vacuum under pressure using an impregnant resin comprising an ether bonding epoxy resin, and thereafter hardening by heating.

In addition, the present invention relates specifically to resin materials which can withstand hot water up to 350° C. without losing mechanical strength.

Epoxy resin becomes a hardened resin having a three-dimensional network structure by heating and using a hardening agent such as a primary amine or acid anhydride. Accordingly, it is broadly used for insulating materials, adhesives, coatings or compound materials comprising glass or carbon fibers as base materials. However, previously known epoxy resin hardened products are inferior in hot water resistance. This is because cross-linked parts between molecules are hydrolyzed when they are used in hot water. For example, when a hardened product obtained by hardening the epoxy resin using an acid anhydride, it is hydrolyzed into carboxylic acid and alcohol in hot water. This is due to the fact that the cross-linked parts have an ester bond.

The present inventors have found that, when epoxy resin is hardened using a catalyst capable of forming an ether bond between molecules, such as a cationic catalyst, anionic catalyst or coordination anionic catalyst in the presence of the above described thermoplastic resin having hot water resistance, the resulted resin material has excellent hot water resistance. Furthermore, the material hardly loses any mechanical strength when it is left in the hot water.

Accordingly, the present invention also relates to hot water resistant resin materials prepared by hardening a resin composition obtained by blending a thermoplastic resin selected from the group consisting of polysulfone resin, polyether sulfone resin, polyphenylene sulfide resin and polytetrafluoroethylene resin with an epoxy resin by heating after addition of a catalyst capable of forming a three-dimensional network structure by forming ether bonds between molecules of the epoxy resin.

desired, a solvent. The ether bonding epoxy resin composition to be incorporated in the impregnant resin is defined as an epoxy resin composition which contains a cationic catalyst, an anionic catalyst or a coordination anionic catalyst. The epoxy resin composition can form a hardened product having a three-dimensional network high molecular structure. The structure is cross-linked by ether bonds by a progress of ring-opening-polymerization of the epoxy resin as shown in the following formula.

The epoxy resin used in one embodiment of the present invention has two or more epoxy groups in the molecule. A typical example is bisphenol epoxy resin represented by the following formula (2), (2a) and (2b): Conduct pipe.
(3), (3a), (3b) and (3c): Electrically insulating layer.

DETAILED DESCRIPTION OF THE INVENTION

In accordance with one embodiment of this invention, a polyether ether ketone resin is used. The resin may be represented, for example, by the following chemical formula, examples of which include aromatic polyether ether ketones developed by Imperial Chemical Industries, Ltd.

The polyether ether ketone resin is used in a filmy state. For example, a film tape having a thickness of 0.05 mm and a width of 15 to 50 mm is applied to the conduct pipe by winding it around the outside of the conduct pipe in layers.

The impregnant resin comprising an ether bonding epoxy resin used in the present invention (hereinafter referred to as impregnant resin, unless stated otherwise) means a resin composition obtained by blending an ether bonding epoxy resin composition with a reactive diluting agent in a suitable ratio or a resin composition obtained by blending an ether bonding epoxy resin composition with a heat resisting thermoplastic resin and, if Preferably "n" in this bisphenol epoxy resin is 15 or less. Examples of resins available in the market include Epikote 828 and Epikote 834 (Shell Chemical Co.), Araldite GY-250 and Araldite GY-6071 (produced by Ciba Ltd.), etc.

Examples of other epoxy resins available in the market other than the above described bisphenol epoxy resin include alicyclic epoxy resin such as Chissonox 221 (produced by Chisso Corp.):

glycidyl ester epoxy resin such as Araldite CY-182 (produced by Ciba Ltd.) or Epikote 190 (produced by Shell Chemical Co.):

novolak epoxy resin such as Araldite EPN 1138 (produced by Ciba Ltd.) or DEN 438 (produced by Dow Chemical Co.):

and cresol novolak epoxy resin such as Araldite ECN 1235, Araldite ECN 1273, Araldite ECN 1280 and Araldite ECN 1299 (produced by Ciba Ltd.):

etc., which are suitably used in the present invention.

Catalysts which are capable of hardening these epoxy resins by forming ether bonds include metal salts of dialkyldithiocarbamic acid, metal salts of carboxylic acid, imidazole compounds, triethanolamine titanatetriphenyl borate complex, boron trifluoride-amine complex, trimethoxyboroxine and boric acid anhydride.

Examples of metal salts of dialkyldithiocarbamic acid include zinc diethyldithiocarbamate, magnesium dibutyldithiocarbamate, iron dimethyldithiocarbamate and tin dibenzyldithiocarbamate. For example, it is believed that zinc diethyldithiocarbamate causes an ether bond forming reaction by coordinating to the epoxy group of the epoxy resin as shown in the following formula:

Examples of the metal salts of carboxylic acid include lead palmitate, zinc caprylate, iron caproate, tin laurate and manganese caproate, etc. For example, it is believed that lead palmitate causes an ether bond forming reaction by coordinating to the epoxy group of the epoxy resin as shown in the following formula:

Acid anhydrides may be added to the metal salt of carboxylic acid as a reaction accelerator. For example, when adding hexahydrophthalic anhydride as a reaction accelerator to zinc caprylate, it is believed that the ether bond forming reaction is caused by carrying out coordination to the epoxy group of the epoxy resin as shown in the following formula:

Examples of the imidazole compound include 2-methylimidazole, 2-ethylimidazole, 2-ethyl-4-methylimidazole, 2-phenylimidazole and 1-cyanoethyl-2-phenyl-4,5-di(cyanoethoxymethyl)imidazole. Compounds obtained by modifying the imidazole compound with dicyandiamide can also be used. For example, it is imagined that 2-ethyl-4-methylimidazole cleaves the epoxy group of the epoxy resin as shown in the following formula:

and the resulting ring-opened product causes an ether bond forming reaction by coordinating to another epoxy group as shown in the following formula.

It is believed that triethanolamine titanatetriphenyl borate complex causes an ether bond forming reaction by coordinating to the epoxy group of the epoxy resin as shown in the following formula.

Examples of the boron trifluoride-amine complex include complexes of boron trifluoride and ethylamine, n-butylamine, benzylamine or imidazole. For example, it is believed that the complex of boron trifluoride and monoethylamine cleaves the epoxy group of the epoxy resin according to the following reaction mechanism to cause an ether bond forming reaction via a cation.

It is believed that the trimethoxyboroxine reacts with the epoxy group of the epoxy resin as shown in the following formula to cause an ether bond forming reaction.

Examples of the reactive diluting agent to be incorporated in the impregnant resin include monoepoxy compounds such as phenyl glycidyl ether, butyl glycidyl ether, acryl glycidyl ether, cresyl glycidyl ether, glycidyl ether of furfuryl alcohol or glycidyl ether of tetrahydrofurfuryl alcohol, etc., and diepoxy compounds such as glycidyl ether of butanediol, glycidyl ether of hexanediol, glycidyl ether of neopentyl glycol or cyclohexenedioxide (for example, Araldite DY-032 (produced by Ciba Ltd.)), etc.

Examples of heat resisting thermoplastic resin include polysulfone resin, polyether sulfone resin, polyphenylene sulfide resin and polytetrafluoroethylene resin, and one or more of them may be used.

The polyether ether ketone resin film is applied to the outside of the conduct pipe by winding it around it layers. It is then impregnated with the impregnant resin by an impregnation treatment in vacuum under pressure. Thereafter, the impregnant resin is hardened by heating. Accordingly, a compound insulating material formed has a polyether ether ketone resin which is completely bonded to the impregnant resin.

Any steel pipe may be used as the metal conduct pipe. However, stainless steel pipes having excellent corrosion resistance and good electric conductivity are preferred. Although the length of the conduct pipe depends upon the depth of the oil sand layer under the ground, a length of about 200 to 600 m or so is generally required.

In accordance with another embodiment of the present invention, the resin materials are obtained by a process which comprises blending homogeneously 10 to 70 parts (by weight, same as above hereinafter) of a thermoplastic resin having hot water resistance selected from the group consisting of polysulfone resin, polyether sulfone resin, polyphenylene sulfide resin and polytetrafluoroethylene resin with 90 to 30 parts of an epoxy resin in the presence or absence of a solvent, adding 0.5 to 40 parts of a catalyst, and heating the sufficiently blended resin composition to about 40° to 380° C. for about 1 to 20 hours.

Examples of such thermoplastic resins having hot water resistance are described in the following.

Polysulfone resin includes polymers represented by the formula (I)

and polymers represented by the formula (II)

(II)

The former is available commercially under the trade name: Bakelite Polysulfone P-1700 (produced by U.C.C. Co.) and the latter is available commercially under the trade name Astrel 360 (produced by U.S. 3M Co.).

Polyether sulfone resin is represented by the formula (III)

(III)

An example of this resin is available under the trade name Victrex (produced by Imperial Chemical Industries, Ltd.).

Polyphenylene sulfide resin is represented by the formula (IV):

(IV)

examples of which include Ryton (produced by Phillips Petroleum Co.) and Susteel (produced by Hodogaya Chemical Co.), etc.

Polytetrafluoroethylene resin is represented by the formula (V):

(V)

an example of which includes Teflon (produced by Du Pont Nemours E. I. and Mitsui Fluorochemical Co.).

These resins do not take part in the above described hardening reaction, and they are taken in the interior of the hardened resin having a three-dimensional network structure resulting from the reaction of the epoxy resin after hardening is carried out.

These thermoplastic resins having hot water resistance are used in an amount of about 10 to 70 parts based on 100 parts of the resin composition. If they are used in an amount of more than 70 parts, the mechanical strength of the resulting resin materials after it is allowed to stand in hot water is insufficient. If it is less than 10 parts, then its hot water resistance is hardly observed.

When hardening agents used conventionally, such as primary amines or acid anhydrides, etc., are used in the present invention, sufficient hot water resistance cannot be obtained in the resulting hardened resin materials. The reason for this has not been sufficiently clarified on the basis of theoretical evidence. However, it is supposed that hardened products of the type of addition reaction by primary amines or hardened products containing ester bonds by acid anhydrides are hydrolyzed by hot water.

The above described hardening reaction can be carried out with using suitable solvents as occasion depends. These solvents are not restricted, and solvents such as water, methanol, ethanol, n-butanol, acetone, methyl ethyl ketone, benzene, toluene and xylene, etc., can be suitably used. Further, it is possible to improve heat resistance and mechanical strength of the hardened resin materials by adding suitable additives, for example, glass fibers, mica powder or silica powder, etc., when carrying out the hardening reaction.

In the following, the portion of the present invention relating specifically to the resin material is illustrated in greater detail with reference to examples and comparative examples, but resin materials of the present invention are not limited these examples.

RESIN MATERIAL EXAMPLE 1

40 parts of polysulfone resin P-1700 (produced by U.C.C. Co.) were added to a mixture composed of 60 parts of dioxane and 30 parts of toluene and dissolved therein with stirring at 45° C. Then, 60 parts of novolak epoxy resin: Araldite EPN 1138 were added as the epoxy resin to dissolve therein with stirring at 45° C. Further, 3 parts of zinc diethyldithiocarbamate were added as a catalyst and blended homogeneously. The resulting mixture was hardened by heating at 100° C. for 2 hours, 150° C. for 5 hours, 180° C. for 2 hours and 230° C. for 1 hour to obtain a hardened resin material.

Tensile strength of the resulting resin material and that of the resin material after being dipped in hot water at 300° C. for 300 hours in an autoclave were measured according to the method ASTM-D638. The results obtained showed that the initial value was 800 kg/cm$^2$ and the value after being dipped was 720 kg/cm$^2$.

RESIN MATERIAL EXAMPLES 2 AND 3

Hardened resin materials were obtained by carrying out the same experiment as in Resin Material Example 1, except that the catalyst and the condition of hardening by heating were replaced with those shown in Catalyst Table 1.

Tensile strength at 25° C. of the resulting resin material and that of the resin material after being dipped in hot water at 300° C. for 300 hours are shown in Catalyst Table 1.

RESIN MATERIAL COMPARATIVE EXAMPLE 1

A hardened resin material was obtained by carrying out the same experiment as in Resin Material Example 1, except that 50 parts of methyltetrahydrophthalic anhydride, 0.5 part of benzyldimethylamine were added as hardening agents instead of zinc diethyldithiocarbamate as the catalyst and the condition of hardening by heating as shown in Catalyst Table 1 was used.

Tensile strength at 25° C. of the resulting resin material and that of the resin material after being dipped in hot water at 300° C. for 300 hours are shown in Catalyst Table 1.

RESIN MATERIAL COMPARATIVE EXAMPLE 2

A hardened resin material was obtained by carrying out the same experiment as in Resin Material Example 1, except that 17 parts of diaminodiphenylmethane were added as a hardening agent instead of zinc diethyldithiocarbamate as the catalyst and the condition of hardening by heating as shown in Catalyst Table 1 was used.

Tensile strength at 25° C. of the resulting resin material and that of the resin material after being dipped in hot water at 300° C. for 300 hours are shown in Catalyst Table 1.

4, except that the catalyst and the condition of hardening by heating were replaced with those shown in Catalyst Table 2.

CATALYST TABLE 1

| Resin Material | Catalyst Compound | Amount (parts) | Condition of Hardening | Tensile Strength (kg/cm$^2$) Initial Value | Value after Dipped in Hot Water |
|---|---|---|---|---|---|
| Example No. | | | | | |
| 1 | Zinc diethyldithiocarbamate | 3 | 100° C. (2 hrs) + 150° C. (5 hrs) + 180° C. (2 hrs) + 230° C. (1 hr) | 800 | 720 |
| 2 | 2-Methylimidazole | 2.5 | 80° C. (1 hr) + 100° C. (1 hr) + 150° C. (2 hrs) + 230° C. (1 hr) | 850 | 770 |
| 3 | Triethanolamine titanate-triphenyl borate complex | 6 | 100° C. (2 hrs) + 150° C. (6 hrs) + 175° C. (2 hrs) + 230° C. (1 hr) | 750 | 700 |
| Comparative Example No. | | | | | |
| 1 | Methyltetrahydrophthalic anhydride (and benzyldimethyldiamine) | 50 (0.5) | 100° C. (2 hrs) + 150° C. (16 hrs) + 175° C. (4 hrs) + 230° C. (1 hr) | 830 | 110 |
| 2 | Diaminodiphenylmethane | 17 | 100° C. (2 hrs) + 130° C. (8 hrs) + 150° C. (4 hrs) + 230° C. (1 hr) | 800 | 120 |

RESIN MATERIAL EXAMPLE 4

20 parts of the polyether sulfone resin 200P (produced by Imperial Chemical Industries Ltd.) were added to 60 parts of the cycloaliphatic epoxy resin: Araldite DY-032 (produced by Ciba Ltd.). After blending with fusing at 150° C., 20 parts of the cycloaliphatic epoxy resin 221 (produced by U.C.C. Co.) were added while keeping the temperature at 150° C. to blend homogeneously. Further, 5 parts of tin caprylate were added as a catalyst, followed by blending homogeneously to obtain a resin composition.

The resulting resin composition was hardened by heating at 150° C. for 8 hours, 175° C. for 4 hours and 250° C. for 2 hours to obtain a hardened resin material. Tensile strength of the resulting resin material and that of the resin material after being dipped in hot water at 300° C. for 300 hours in an autoclave were measured according to the method ASTM-D638. The results showed the initial value was 900 kg/cm$^2$ and the value after being dipped was 820 kg/cm$^2$.

RESIN MATERIAL EXAMPLES 5 AND 6

Hardened resin materials were obtained by carrying out the same experiment as in Resin Material Example 4, except that the catalyst and the condition of hardening by heating were replaced with those shown in Catalyst Table 2.

Tensile strength of the resulting resin materials and that of the resin materials after being dipped in hot water at 300° C. for 300 hours are shown in Catalyst Table 2.

RESIN MATERIAL COMPARATIVE EXAMPLE 3

A hardened resin material was obtained by carrying out the same experiment as in Resin Material Example 4, except that 104 parts of methyltetrahydrophthalic anhydride and 0.8 part of benzyldimethylamine were added as hardening agents instead of tin caprylate as the catalyst and the condition of hardening by heating was replaced with the condition shown in Catalyst Table 2.

Tensile strength at 25° C. of the resulting resin material and that of the resin material after being dipped in hot water at 300° C. for 300 hours are shown in Catalyst Table 2.

CATALYST TABLE 2

| Resin Material | Catalyst Compound | Amount (parts) | Condition of Hardening | Tensile Strength (kg/cm$^2$) Initial Value | Value after Dipped in Hot Water |
|---|---|---|---|---|---|
| Example No. | | | | | |
| 4 | Tin caprylate | 5 | 150° C. (8 hrs) + 175° C. (4 hrs) + 250° C. (2 hrs) | 900 | 820 |
| 5 | 2-Ethyl-4-methyl- | 4 | 150° C. (8 hrs) + 175° C. (4 hrs) + 250° C. (2 hrs) | 1,100 | 1,010 |
| 6 | Borobn trifluoride-monoethylamine complex | 4 | 150° C. (8 hrs) + 175° C. (2 hrs) + 250° C. (2 hrs) | 1,040 | 950 |
| Comparative Example No. 3 | Methylhexahydrophthalic anhydride (and benzyldimethylamine) | 104 (0.8) | 150° C. (16 hrs) + 175° C. (4 hrs) + 250° C. (2 hrs) | 1,050 | 105 |

RESIN MATERIAL EXAMPLE 7

180 parts of a 30% aqueous dispersion of polyphenylene sulfide resin: Susteel CP-4 (produced by Hodogaya Chemical Co., Ltd.) (54 parts as the resin component)

were blended with 100 parts of butyl alcohol, followed by blending with 46 parts of bisphenol epoxy resin: Epikote 828 as the epoxy resin. Further, 2.5 parts of tin dibutyldithiocarbamate were added as a catalyst, followed by sufficiently blending to obtain a homogeneous resin composition.

The resulting resin composition was hardened by heating at 90° C. for 4 hours, 110° C. for 4 hours, 150° C. for 8 hours, 200° C. for 2 hours and 370° C. for 30 minutes to obtain a hardened resin material.

Tensile strength of the resulting resin material and that of the resin material after being dipped in hot water at 300° C. for 300 hours in an autoclave were measured by the method ASTM-D638. The results show that the initial value was 600 kg/cm$^2$ and the value after being dipped was 550 kg/cm$^2$.

RESIN MATERIAL EXAMPLES 8 AND 9

Hardened resin materials were obtained by carrying out the same experiment as in Resin Material Example 7, except that the catalyst and the condition of hardening by heating were replaced with those shown in Catalyst Table 3.

Tensile strength of the resulting resin material and that of the resin material after being dipped in hot water at 300° C. for 300 hours are shown in Catalyst Table 3.

CATALYST TABLE 3

| Resin Material Example No. | Catalyst Compound | Amount (parts) | Condition of Hardening | Tensile Strength (kg/cm$^2$) Initial Value | Value after Dipped in Hot Water |
| --- | --- | --- | --- | --- | --- |
| 7 | Tin dibutyl-dithiocarbamate | 2.5 | 90° C. (4 hrs) + 110° C. (4 hrs) + 150° C. (8 hrs) + 200° C. (2 hrs) + 370° C. (30 min) | 600 | 550 |
| 8 | Trimethoxy-boroxine | 2 | 90° C. (4 hrs) + 110° C. (4 hrs) + 170° C. (3 hrs) + 370° C. (30 min) | 650 | 590 |
| 9 | Boric anhydride | 40 | 40° C. (1 hr) + 60° C. (3 hrs) + 100° C. (5 hrs) + 200° C. (2 hrs) + 370° C. (30 min) | 850 | 770 |

RESIN MATERIAL EXAMPLE 10

100 parts of a 35% aqueous dispersion of polytetrafluoroethylene resin: 30-J (produced by Mitsui Fluorochemical Co.) (35 parts as the resin component) were blended with a mixture composed of 30 parts of butyl alcohol and 30 parts of methyl alcohol. 65 parts of glycidyl ester epoxy resin: Araldite CY 182 (produced by Ciba-Geigy (Japan) Co.) were then added as the epoxy resin. Further, 3 parts of 1-cyanoethyl-2-phenyl-4,5-di(-cyanoethoxymethyl)imidazole were added as the catalyst, followed by blending sufficiently to obtain a homogeneous resin composition.

The resulting resin composition was hardened by heating at 100° C. for 4 hours, 150° C. for 4 hours and 360° C. for 1 hour to obtain a hardened resin material.

Tensile strength at 25° C. of the resulting resin material and that of the resin material after being dipped in hot water at 300° C. for 300 hours in an autoclave were measured according to the method: ASTM-D638. The results show that the initial value was 400 kg/cm$^2$ and the value after being dipped was 365 kg/cm$^2$.

In the following, embodiments of the conduct pipe covered with the electrically insulating material of the present invention are illustrated.

Figure 1:
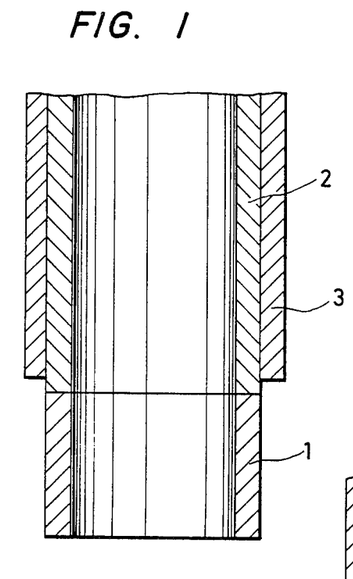
FIG. 1 is a partially sectional view of the end part of a conduct pipe covered with electrical insulating material.

FIG. 1 is a partially sectional view of an end part of the conduct pipe covered with the electrically insulating material. As shown in FIG. 1, the outside of a metal conduct pipe (2) connecting with an electrode (1) is covered with a compound insulating layer (3) composed of a polyether ether ketone resin film and an impregnant resin. Alternatively, the layer may be comprised of hot water resistant resin materials which are prepared by hardening a resin composition obtained by blending a thermoplastic resin selected from the group consisting of polysulfone resin, polyether sulfone resin, polyphenylene sulfide resin and polytetrafluoroethylene resin with an epoxy resin by heating after addition of a catalyst capable of forming a three-dimensional network structure by forming ether bonds between molecules of epoxy resin. Such resin materials were described above in detail.

Generally, the conduct pipe (2) must have a length of about 200 to 600 m. Since the steel pipes and stainless steel pipes generally each has a length of 5–50 m, they are connected together when inserting the end part of the conduct pipe into the oil sand layer.

Figure 2:
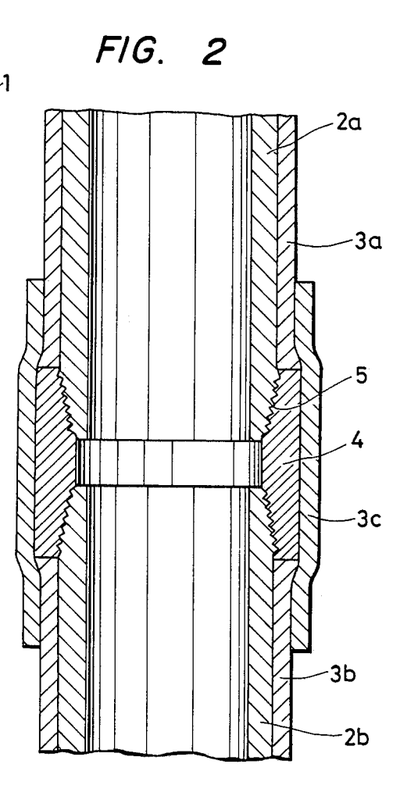
FIG. 2 is a partially sectional view of a junction part of a conduct pipe covered with electrical insulating material.

FIG. 2 is a partial sectional view of the conjunction part of the conduct pipe covered with the electrical insulating material. As shown in Table 2, when connecting a conduct pipe (2a) covered with a compound insulating material (3a) to a conduct pipe (2b) covered with a compound insulating material (3b), the end parts of the conduct pipes (2a) and (2b) are processed so as to have a taper screw (5) to connect each other by means of a coupling (4). In this case, the conjunction part, namely, the surface of the coupling (4), and the end parts of the conduct pipes are covered with a compound insulating material (3c) in order to prevent a leakage of electricity from the conjunction part.

While the invention has been described with reference to a conduct pipe covered with an electrically insulating material useful in an electrode apparatus for collecting underground hydrocarbon resources, it is not to be construed that the invention is limited thereto. In other words, the conduct pipe of the present invention can also be used as a pipe for oil pipeline, a conduit of chemical plant, etc.

In the following, the method of covering with the compound insulating material and properties of additional insulating materials are illustrated in detail with reference to examples and comparative examples, but the present invention is not limited to these examples.

EXAMPLE 1

A tape of polyether ether ketone resin film having a thickness of 0.05 mm and a width of 30 mm was wound around a conduct pipe 20 times. The tape was wrapped so that a half width of the tape wrapped on itself to obtain an unimpregnated insulating layer having a thickness of 2.0 mm. Then, the layer was impregnated with an impregnant resin composed of 40 parts (parts by weight, the same meaning, hereinafter) of Epikote 828, 40 parts of Chissonox 221, 30 parts of phenyl glycidyl ether and 5 parts of zinc diethyldithiocarbamate by vacuum impregnation treatment under 0.5 mmHg for 1 hour and a pressure of 5 Kg/cm$^2$ for 16 hours, followed by hardening by heating at 150° C. for 5 hours and 180° C. for 3 hours.

Tensile strength (kg/cm$^2$) at 25° C. and dielectric breakdown voltage (kV/mm) of the resulted insulating layer and those of the insulating layer after being dipped in hot water at 300° C. for 500 hours are shown in Table 1.

EXAMPLES 2 TO 5

Experiments were carried out by the same procedure as in Example 1, except that the composition of the impregnant resin and the condition of hardening by heating were replaced with those shown in Table 1, to form an insulating layer on the outside of the conduct pipe. Characteristics of the resulted insulating layer are shown in Table 1.

EXAMPLE 6

A tape of polyether ether ketone resin film having a thickness of 0.2 mm and a width of 38 mm was wound around a conduct pipe 8 times. The tape was wound so that a half width of the tape was wound on itself to obtain an unimpregnated insulating layer having a thickness of 3.2 mm. Then, the insulating layer was impregnated with an impregnant resin composed of 90 parts of Araldite ECN 1273, 10 parts of Araldite DY-032, 5 parts of 2-ethyl-4-methylimidazole, 70 parts of polysulfone resin, 80 parts of dioxane and 40 parts of toluene by vacuum impregnation treatment under 2 mmHg for 1 hour and a pressure of 5 kg/cm$^2$ for 16 hours, followed by hardening by heating to 100° C. for 2 hours, 150° C. for 2 hours and 250° C. for 1 hour. This operation (impregnation treatment and hardening by heating) was repeated 3 times. Characteristics of the resulting insulating layer are shown in Table 2.

EXAMPLES 7 TO 11

Experiments were carried out by the same procedures as in Example 6, except that the composition of the impregnant resin and the condition of hardening by heating were replaced with those shown in Table 2. In Example 7, the impregnation treatment and the hardening by heating were carried out one time. Characteristics of the resulting layer are shown in Table 2.

TABLE 1

| | Example No. | | | | |
|---|---|---|---|---|---|
| | 1 | 2 | 3 | 4 | 5 |
| Resin for impregnation (parts) | | | | | |
| Epikote 828 | 40 | — | — | 50 | 20 |
| Chissonox 221 | 40 | — | 30 | — | 10 |
| Araldite CY 182 | — | 40 | 30 | — | 10 |
| Araldite EPN 1138 | — | 40 | — | — | 30 |
| Phenyl glycidyl ether | 20 | — | — | 10 | — |
| Cresyl glycidyl ether | — | — | 10 | — | 10 |
| Neopentyl glycol diglycidyl ether | — | 10 | — | — | 10 |
| Araldite DY-032 | — | 10 | 30 | 40 | 10 |
| Zinc diethyldithiocarbamate | 5 | — | — | — | — |
| 2-Ethyl-4-methylimidazole | — | 4 | — | — | — |
| Triethanolamine titanate-triphenyl borate complex | — | — | 6 | — | — |
| Boron trifluoride-monoethylamine complex | — | — | — | 5 | — |
| Trimethoxyboroxine | — | — | — | — | 3 |
| Condition of hardening | 150° C. (6 hr) + 180° C. (3 hr) | 80° C. (1 hr) + 150° C. (3 hr) | 150° C. (8 hr) + 180° C. (5 hr) | 155° C. (8 hr) + 180° C. (3 hr) | 110° C. (5 hr) + 170° C. (5 hr) |
| Characteristics | | | | | |
| Initial value | | | | | |
| Tensile strength (kg/cm$^2$) | 1,060 | 1,080 | 1,040 | 1,050 | 1,070 |
| Dielectric breakdown voltage (kV/mm) | 40 | 41 | 39 | 38 | 40 |
| After hot water treatment | | | | | |
| Tensile strength (kg/cm$^2$) | 960 | 965 | 940 | 900 | 910 |
| Dielectric breakdown voltage (kV/mm) | 31 | 32 | 30 | 28 | 29 |

TABLE 2

| | Example No. | | | | | |
|---|---|---|---|---|---|---|
| | 6 | 7 | 8 | 9 | 10 | 11 |
| Resin for impregnation (part) | | | | | | |
| Chissonox 221 | — | 20 | — | — | 10 | 70 |
| Araldite ECN 1273 | 90 | 50 | 80 | 80 | 60 | — |
| Cresyl glycidyl ether | — | 20 | 10 | 20 | 10 | — |
| Araldite DY-032 | 10 | 10 | 10 | — | 20 | 30 |
| Zinc caprylate | — | 10 | — | — | 10 | — |
| Boric acid anhydride | — | — | 5 | — | — | 4 |

TABLE 2-continued

| | Example No. | | | | | |
|---|---|---|---|---|---|---|
| | 6 | 7 | 8 | 9 | 10 | 11 |
| 2-Ethyl-4-methylimidazole | 5 | — | — | 5 | — | — |
| Polysulfone resin | 70 | 15 | 100 | — | — | — |
| Polyether sulfone resin | — | — | — | 20 | 10 | 25 |
| Dioxane | 80 | — | 60 | 30 | 30 | 50 |
| Toluene | 40 | — | 20 | 20 | 20 | — |
| N—Methylpyrrolidone | — | — | — | 50 | 40 | 60 |
| Condition of hardening | 100° C. (2 hr) + 150° C. (2 hr) + 250° C. (1 hr) | 150° C. (2 hr) + 200° C. (2 hr) + 230° C. (2 hr) | 60° (3 hr) + 100° C. (5 hr) + 200° C. (2 hr) + 280° C. (1 hr) | 80° C. (1 hr) + 150° C. (2 hr) + 230° C. (1 hr) | 150° C. (8 hr) + 200° C. (2 hr) + 230° C. (1 hr) | 60° C. (5 hr) + 100° C. (6 hr) + 200° C. (2 hr) + 230° C. (1 hr) |
| Characteristics Initial value | | | | | | |
| Tensile strength (kg/cm$^2$) | 1,100 | 1,200 | 1,090 | 1,100 | 1,080 | 1,050 |
| Dielectric breakdown voltage (kV/mm) | 39 | 40 | 39 | 38 | 38 | 36 |
| After hot water treatment | | | | | | |
| Tensile strength (kg/cm$^2$) | 980 | 1,010 | 970 | 960 | 950 | 910 |
| Dielectric breakdown voltage (kV/mm) | 31 | 31 | 33 | 32 | 31 | 29 |

COMPARATIVE EXAMPLE 1

An experiment was carried out by the same procedure as in Example 1 to form an insulating layer on the outside of a conduct pipe, except that an impregnant resin containing 168 parts of methylhexahydrophthalic anhydride and 0.5 part of benzyldimethylamine instead of zinc diethyldithiocarbamate was used and the hardening was carried out at 150° C. for 16 hours and 175° C. for 4 hours. Characteristics of the resulting insulating layer are shown in Table 3.

COMPARATIVE EXAMPLE 2

An experiment was carried out by the same procedure as in Example 10 to form an insulating layer on the outside of a conduct pipe, except that cresyl glycidyl ether and Araldite DY-032 were not added and 7 parts of zinc caprylate were used. Characteristics of the resulting insulating layer are shown in Table 3.

TABLE 3

| | Initial Value | | After Hot Water Treatment | |
|---|---|---|---|---|
| Comparative Example No. | Tensile Strength (kg/cm$^2$) | Dielectric Breakdown Voltage (kV/mm) | Tensile Strength (kg/cm$^2$) | Dielectric Breakdown Voltage (kV/mm) |
| 1 | 1,100 | 40 | 120 | 15 |
| 2 | 920 | 35 | 160 | 21 |

As can be understood from Table 1 and Table 2, in the conduct pipes covered with the electrically insulating material of the present invention, the insulating layers have excellent electric and mechanical properties and the characteristics thereof are substantially maintained even if allowed to stand in hot water for a long time.

In the insulating layer obtained in Comparative Example 1 using acid anhydride as a hardening agent, the hardened product of the epoxy resin has a structure cross-linked by ester bonds and characteristics after the hot water treatment deteriorate remarkably, because ester bonds are hydrolyzed in hot water. In the insulating layer obtained in Comparative Example 2, the degree of polymerization of the epoxy resin becomes low, because an epoxy resin having a low molecular weight is not used. Consequently, characteristics after the hot water treatment deteriorate.

While the invention has been described in detail with reference to specific embodiments thereof, it will be apparent to one skilled in the art that various changes and modifications can be made therein without departing from the spirit and scope thereof.

What is claimed is:

1. A hot water resistant conduct pipe produced by the process comprising:
   (1) winding a polyether ether ketone resin film around the outside of a metal conduct pipe,
   (2) carrying out impregnation treatment in a vacuum and then under pressure using an impregnant resin obtained by blending a mixture of:
      (a) an epoxy resin,
      (b) a reactive diluting agent, and
      (c) a catalyst capable of forming a three-dimensional network structure by forming ether bonds between the molecules of the epoxy resin, wherein said epoxy resin is selected from the group consisting of bisphenol epoxy resin, alicyclic epoxy resin, glycidyl ester epoxy resin, novalak epoxy resin and cresol novalak epoxy resin and wherein said catalyst is selected from the group consisting of a metal salt of dialkyldithiocarbamic acid, a metal salt of carboxylic acid, imidazole compounds, triethanolamine titanatetriphenyl borate complex, boron trifluoride-amine complex, trimethoxy-boroxine and boric acid anhydride, and thereafter
   (3) hardening by heating, wherein said conduct pipe has an electrode on an end thereof, wherein said conduct pipe is useful in an electrode apparatus for collecting underground hydrocarbon resources by an electrically heating method and, wherein said electrically heating method is conducted by applying a high electric potential to both electrodes attached to a pair of said conduct pipes situated on an oil sand layer.

2. A conduct pipe as claimed in claim 1, wherein said reactive diluting agent is selected from the group consisting of monoepoxy compounds and diepoxy compounds, wherein said monoepoxy compounds are selected from the group consisting of phenyl glycidyl ether, butyl glycidyl ether, acryl glycidyl ether, cresyl glycidyl ether, glycidyl ether of furfuryl alcohol and glycidyl ether of tetrahydrofurfuryl alcohol and wherein said diepoxy compounds are selected from the group consisting of glycidyl ether of butanediol, glycidyl ether of hexanediol, glycidyl ether of neopentyl glycol and glycidyl ether of cyclohexenedioxide.

3. The conduct pipe as claimed in claim 1, wherein the temperature reached by said electrically heating method is about 300° C.

4. A hot water resistant conduct pipe produced by the process comprising:
  (1) winding a polyether ether ketone resin film around the outside of a metal conduct pipe,
  (2) carrying out impregnation treatment in a vacuum and then under pressure using an impregnant resin obtained by blending a mixture of:
    (a) an epoxy resin,
    (b) a heat resisting thermoplastic resin selected from at least one member of the group consisting of polysulfone resin, polyether sulfone resin, polyphenylene sulfide resin and polytetrafluoroethylene resin, and
    (c) a catalyst capable of forming a three-dimensional network structure by forming ether bonds between molecules of the epoxy resin, wherein said epoxy resin is selected from the group consisting of bisphenol epoxy resin, alicyclic epoxy resin, glycidyl ester epoxy resin, novolak epoxy resin and cresol novolak epoxy resin, and wherein said catalyst is selected from the group consisting of a metal salt of dialkyldithiocarbamic acid, a metal salt of carboxylic acid, imidazole compounds, triethanolamine titanatetriphenyl borate complex, boron trifluoride-amine complex, trimethoxy-boroxine and boric acid anhydride, and thereafter
  (3) hardening by heating,
  wherein said conduct pipe has an electrode on an end thereof, wherein said conduct pipe is useful in an electrode apparatus for collecting underground hydrocarbon resources by an electrically heating method, and wherein said electrically heating method is conducted by applying a high electrical potential to both electrodes attached to a pair of said conduct pipes situated on an oil sand layer.

5. The conduct pipe as claimed in claim 4, wherein the temperature reached by said electrically heating method is about 300° C.

* * * * *